United States Patent
Zhao et al.

(10) Patent No.: US 8,050,207 B2
(45) Date of Patent: Nov. 1, 2011

(54) POWER SAVING TECHNIQUES BASED ON COVERAGE CONDITIONS

(75) Inventors: Wen Zhao, San Jose, CA (US); Isabel Mahe, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1069 days.

(21) Appl. No.: 11/848,627

(22) Filed: Aug. 31, 2007

(65) Prior Publication Data

US 2009/0059826 A1 Mar. 5, 2009

(51) Int. Cl.
*G08C 17/00* (2006.01)

(52) U.S. Cl. ...................................................... 370/311

(58) Field of Classification Search .................. 370/310, 370/311, 328, 229, 230, 254, 252; 455/343.1, 455/343.2, 343.3, 343.5, 343.4, 343.6; 340/7.32
See application file for complete search history.

(56) References Cited

U.S. PATENT DOCUMENTS

| | | | | |
|---|---|---|---|---|
| 6,272,325 | B1 * | 8/2001 | Wiedeman et al. | 455/117 |
| 7,493,147 | B2 * | 2/2009 | Okamoto et al. | 455/572 |
| 7,542,428 | B1 * | 6/2009 | Johnson et al. | 370/241 |
| 7,599,718 | B2 * | 10/2009 | Kim | 455/574 |
| 2006/0168308 | A1 * | 7/2006 | Celi et al. | 709/232 |
| 2006/0270385 | A1 * | 11/2006 | Morris | 455/405 |
| 2007/0047476 | A1 | 3/2007 | Zhao et al. | |

* cited by examiner

*Primary Examiner* — Kwang B Yao
*Assistant Examiner* — Anh Ngoc Nguyen

(57) ABSTRACT

Techniques for managing power consumption are disclosed. For instance, an apparatus may include a first network interface module, a second network interface module, and a power management module. The first network interface module may communicate with wireless networks of a first network type, and the second network interface module may communicate with wireless networks of a second network type. Examples of first and second network types are EVDO and CDMA2000, respectively. The power management module may suspend one or more operations of the first network interface module when a number of first network type outages exceeds a predetermined outage threshold within a predetermined time interval.

21 Claims, 5 Drawing Sheets

POWER SAVING TECHNIQUES BASED ON COVERAGE CONDITIONS

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may employ various wireless communications technologies (e.g., cellular, satellite, and/or mobile data networking technologies) to provide features, such as mobile telephony, mobile e-mail access, web browsing, and content (e.g., video and radio) reception. For instance, devices may communicate across CDMA2000 and EVDO networks.

CDMA2000 networks (also called 1x networks) are cellular networks that employ code division multiple access (CDMA) transmission techniques. CDMA2000 networks provide voice communications (e.g., wireless telephony). In addition, CDMA networks provide for wireless data communications. EVDO networks (EVDO stands for Evolution-Data Optimized or Evolution-Data only) also employ CDMA transmission techniques. However, EVDO provides data communications at data rates greater than CDMA2000 networks. The EVDO standard has been given the numerical designation IS-856 by the International Telecommunications Union (ITU).

Network carriers or operators typically provide EVDO coverage alongside CDMA2000 coverage. However, EVDO network coverage is not always provided where CDMA2000 coverage exists. For instance, EVDO coverage is often absent in less populated or rural areas. This is due to a lower demand for data communications (as well as a need to ensure better voice communications) in these areas.

Typically, batteries provide operational power for mobile devices. Therefore, it is desirable to prolong battery life by reducing a mobile device's power demand. This may involve making one or more of its operations more power efficient.

Unfortunately, a mobile device having both CDMA2000 and EVDO capabilities may experience an unduly short battery life in areas that provide CDMA2000 coverage but no EVDO coverage. This is because the mobile device may be consuming operational power for one or more unnecessary functions associated with EVDO communications.

DETAILED DESCRIPTION

Figure 1:
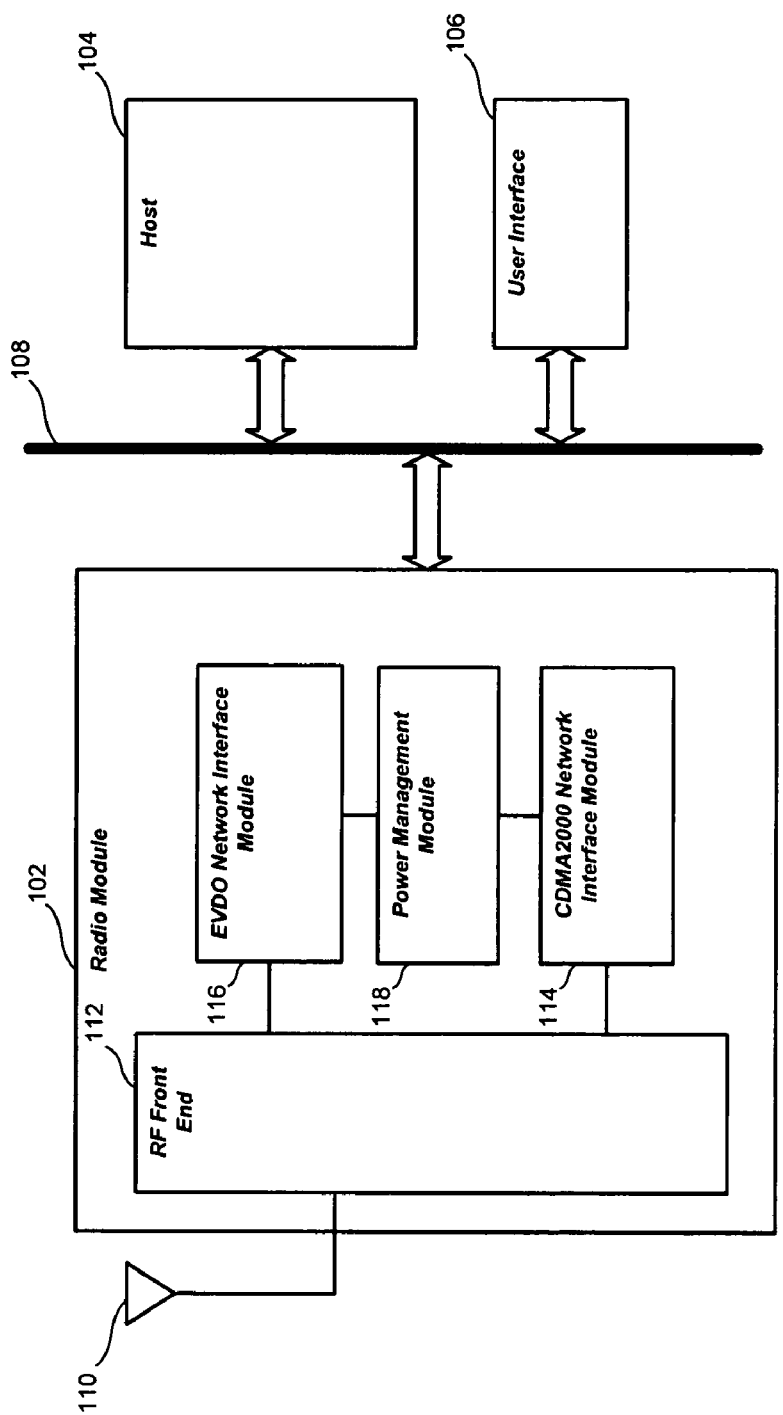
FIG. 1 illustrates an embodiment of an apparatus.

Various embodiments may be generally directed to techniques for managing power consumption. For instance, an apparatus may include a first network interface module, a second network interface module, and a power management module. The first network interface module may communicate with wireless networks of a first network type, and the second network interface module may communicate with wireless networks of a second network type. Examples of first and second network types are EVDO and CDMA2000, respectively. The power management module may suspend one or more operations of the first network interface module when a number of first network type outages exceeds a predetermined outage threshold within a predetermined time interval. At this point, however, operations of the second network interface module may continue. Thus, communications across network(s) of the second type may remain available.

This suspension of first network interface module operation(s) may occur for a suspension time interval. The length of the suspension time interval may be based on various factors, such as the number of first network type outages within the predetermined time interval. When the suspension time interval elapses, the suspended operation(s) may resume.

Also, in embodiments, the suspended operation(s) of the first network interface module may resume before the suspension time interval elapses. For example, the suspended operation(s) may resume when a data communication is initiated.

In this case, the data communication may first be attempted across a network of the first type. However, if a network of the first type is unavailable. The data communication may then be attempted across a network of the second type. Thus, if resumed operation(s) of the first network interface module fail (e.g., if paging message(s) are not received and/or decoded) from a network of the first network type, then the data communication is directed to the second network interface module to attempt transmission across network(s) of the second network type.

Thus, in embodiments where the first type is EVDO and the second network type is CDMA2000 (1x), the data communication is first attempted across an EVDO network. However, if EVDO service is unavailable, then the data communication is attempted across a CDMA2000 network.

Various advantages may be obtained through such techniques. For instance, power consumption may be reduced in mobile devices. Such reductions may extend battery life time and increase user convenience.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment" or "in an embodiment" in various places in the specification are not necessarily all referring to the same embodiment.

FIG. 1 illustrates an embodiment of an apparatus that may engage in communications across wireless networks. In particular, FIG. 1 shows an apparatus 100 comprising various elements. The embodiments, however, are not limited to these depicted elements. FIG. 1 shows that apparatus 100 may include a radio module 102, a host 104, a user interface 106, and an interconnection medium 108. These elements may be implemented in hardware, software, firmware, or in any combination thereof.

Radio module 102 may communicate through one or more antennas (such as an antenna 110) with remote devices (such as cellular base stations) across various types of wireless links. For example, radio module 102 may communicate across CDMA2000 networks and EVDO networks. The embodiments, however, are not limited to these network types.

Accordingly, FIG. 1 shows that radio module 102 may include an RF front end 112, a CDMA2000 network interface module 114 that provides for CDMA2000 communications, and an EVDO network interface module 116 that provides for EVDO communications. Further, FIG. 1 shows that radio module 102 may include a power management module 118 that manages the power consumption of network interface modules 114 and/or 116. As described below in greater detail, power management module 118 may manage power consumption based on one or more operational conditions.

Host 104 may perform operations associated with user applications. Exemplary user applications include telephony, text messaging, e-mail, web browsing, word processing, and so forth. Furthermore, host 104 may perform operations associated with one or more protocols (e.g., multiple protocols at various layers). Moreover, host 104 may provide one or more functional utilities that are available to various protocols, operations, and/or applications. Exemplary utilities include operating systems, device drivers, user interface functionality, and so forth.

User interface 106 facilitates user interaction with apparatus 100. This interaction may involve the input of information from a user and/or the output of information to a user. Accordingly, user interface 106 may include one or more devices, such as a keyboard (e.g., a full QWERTY keyboard), a keypad, a touch screen, a microphone, and/or an audio speaker.

Interconnection medium 108 provides for couplings among elements, such as radio module 102, host 104, and user interface 106. For instance, interconnection medium 108 may provide for the exchange of information among power management module 118, CDMA2000 network interface module 114, EVDO network interface module 116, and/or host 106, as described herein.

Interconnection medium 108 may include one or more interfaces that provide for the exchange of information. Exemplary interfaces include Universal Serial Bus (USB) interfaces, as well as various computer system bus interfaces. Additionally or alternatively, interconnection medium 108 may include one or more point-to-point connections (e.g., parallel interfaces, serial interfaces, etc.) between various element pairings. Such connections may comprise one or more signal lines. Moreover, interconnection medium 108 may include non-physical aspects. For instance, such interconnectivity may be implemented through messages passed between processes or software modules.

As described above, radio module 102 may include an RF front end 112, a CDMA2000 network interface module 114, an EVDO network interface module 116, and a power management module 118. Also, as described above, these elements may be implemented in hardware, software, firmware, or any combination thereof.

RF front end 112 prepares signals generated by network interface modules 114 and 116 for wireless transmission (e.g., via antenna 110). Additionally, RF front end 112 prepares received wireless signals for demodulation and processing by network interface modules 114 and 116. RF front end 112 may include various components (e.g., electronics) such as amplifiers, filters, diplexers, and/or circulators. However, the embodiments are not limited to these examples.

CDMA2000 network interface module 114 provides for communications (via RF front end 112) with CDMA2000 networks. Accordingly, CDMA2000 network interface module 114 may include a modem to modulate signals for wireless transmission and to demodulate received wireless signals. Also, CDMA2000 network interface module 114 may include timing functionality to operate in accordance with network timing constructs, such as CDMA2000 network time slots.

Additionally, CDMA2000 network interface module 114 may process information received from CDMA2000 network entities (such as base stations). For example, network interface module 114 may process received pilot signals to achieve network synchronization. Also, CDMA2000 network interface module 114 may process received paging messages. Based on the reception of such messages, CDMA2000 network interface module 114 may commence various communications, such as voice calls and/or sessions involving data communications. However, the embodiments are not limited to these examples.

EVDO network interface module 116 provides for communications (via RF front end 112) with EVDO networks. Thus, EVDO network interface module 116 may include a modem to modulate signals for wireless transmission and to demodulate received wireless signals. Also, EVDO network interface module 116 may include timing functionality to operate in accordance with network timing constructs, such as EVDO network time slots.

Further, EVDO network interface module 116 may process information received from EVDO network entities (such as base stations). For example, network interface module 116 may process received pilot signals to achieve network synchronization. Also, EVDO network interface module 116 may process received paging messages. Based on the reception of such messages, EVDO network interface module 116 may commence various communications, such sessions involving data communications. However, the embodiments are not limited to these examples.

In addition to communicating with wireless network entities (e.g., base stations), network interface modules 114 and 116 may each exchange information with host 104. For instance, CDMA2000 network interface module 114 may exchange voice signals and data (e.g., Internet Protocol (IP) traffic) with host 104. Such voice signals and data correspond to signals exchanged wirelessly with CDMA2000 network entities. Similarly, EVDO network interface module 116 may exchange data, such as IP traffic, with host 104 that corresponds to signals exchanged wirelessly with EVDO network entities. Such CDMA2000 and EVDO network entities may include one or more base stations.

As described above, the elements of FIG. 1 may be implemented in hardware, software, firmware, or any combination thereof. Thus, implementations may include one or more processors that execute instructions or control logic stored in a storage medium (e.g., memory). Such storage media may further be included in apparatus 100. In exemplary implementations, one or more processors may be associated with host 104, and one or more processors may be associated with radio module 102. The embodiments, however, are not limited to such implementations.

Power management module 118 may control various operations of EVDO network interface module 116 and/or CDMA2000 network interface module 114. For example, power management module 118 may assess conditions regarding EVDO network coverage and/or CDMA2000 network coverage. Based on these assessed conditions, power management module 118 may direct network interface modules 114 and/or 116 to suspend one or more of their operations.

Such operations may be suspended, for example, when apparatus 100 experiences a number of EVDO network outages that exceed a predetermined outage threshold within a predetermined time interval. Such outages indicate that EVDO coverage is no longer available or is becoming unavailable. For example, when such outages occur, apparatus 100 may be in an area served by one or more base stations that do not provide EVDO service. Also, such outages may indicate that apparatus 100 may be on an edge or boundary of a cell in which EVDO service is provided, but is unreliable.

An EVDO outage may be determined by EVDO network interface module 116. This determination may be based on a failure to receive certain downlink network transmissions that occur on a repeated basis. Examples of such transmissions include (but are not limited to) pilot signals and/or paging messages. For instance, EVDO network interface module 116 may indicate an EVDO outage when a scheduled paging message is not received and//or decoded. Alternatively or additionally, an EVDO outage may be based on low signal strength of downlink EVDO transmissions. The embodiments, however, are not limited to these examples.

In embodiments, EVDO network interface module 116 provides an outage indicator to power management module 118 when an EVDO outage occurs. Based on such received indicators, power management module 118 determines whether one or more conditions exists for suspending one or more operations of EVDO network interface module 116. When such condition(s) exist, power management module 118 may then send EVDO network interface module 116 directives to suspend such operations.

Power management module 118 may determine time interval durations for the suspension of such operation(s). Thus, power management module 118 may determine when such durations have elapsed. When such durations have elapsed, power management module 118 may send EVDO network interface module 116 directives to resume the operation(s) that were suspended.

Suspended operations may involve wireless network monitoring and/or the continuance of wireless network contact. Suspending such operations may reduce power consumed by EVDO network interface module 116. In embodiments, such suspension of operations may involve placing EVDO network interface module 116 in a sleep state.

As described above, EVDO operations may be suspended for intervals of predetermined time durations. However, in embodiments, EVDO network interface module 116 may resume operations before such time intervals have elapsed. For instance, EVDO operations may resume when an EVDO data communication (e.g., an EVDO data call) is initiated. Such data communications may originate from host 104. For instance, a user application (e.g., a web browser, an e-mail application, etc.) may initiate a data communication. The embodiments, however, are not limited to these forms of data communication initiation.

FIG. 1 provides an exemplary apparatus arrangement. However, the embodiments are not limited to this arrangement. For instance, embodiments are not limited to CDMA2000 and/or EVDO communications. Thus, network interface module 114 may alternatively provide for communications across wireless networks of types other than CDMA2000. Also, network interface module 116 may alternatively provide for communications across wireless networks of types other than EVDO. Further, embodiments are not limited to particular versions or releases of EVDO and/or CDMA2000.

Moreover, embodiments may include further network interface modules that provide for communications across various types of wireless networks. Examples of such wireless networks include wireless local area networks (WLANs), wireless metropolitan area networks (WMANs), and personal area networks (PANs).

Figure 2:
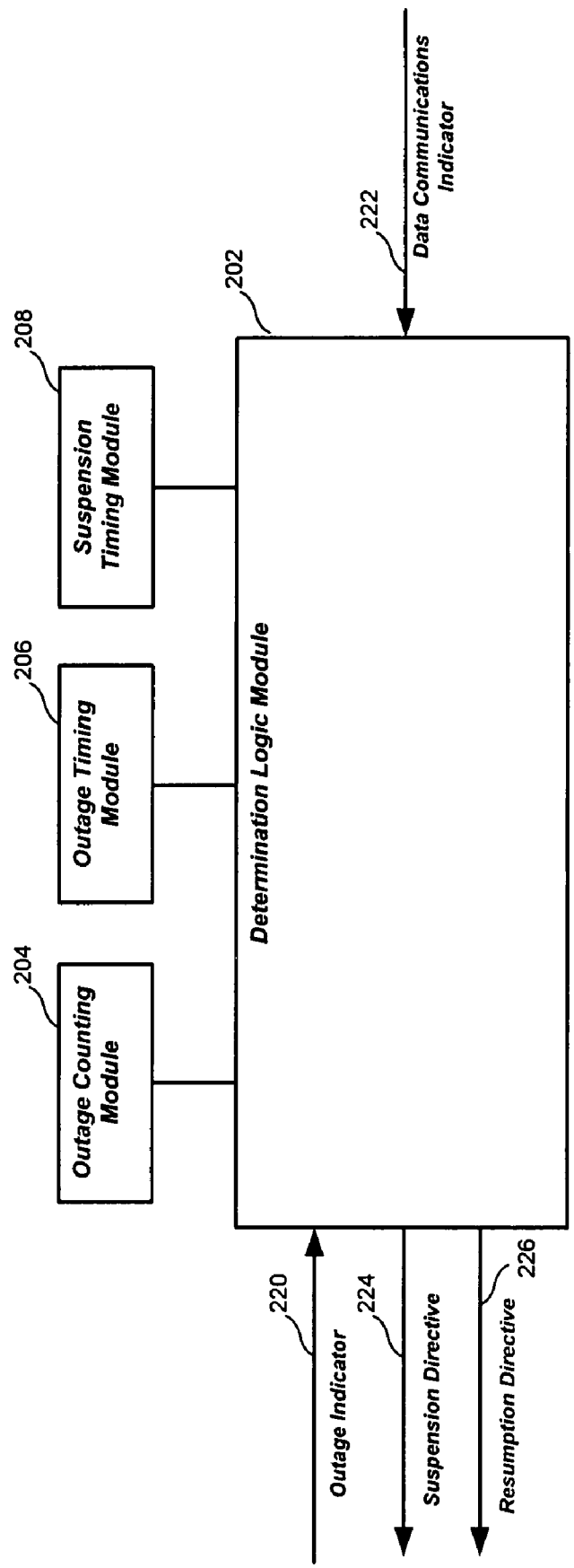
FIG. 2 illustrates an exemplary implementation embodiment.

FIG. 2 is a diagram of an exemplary implementation 200. With reference to FIG. 1, this implementation may be included in power management module 118. The embodiments, however, are not limited to this context.

Implementation 200 may include various elements. For example, FIG. 2 shows that implementation 200 may include a determination logic module 202, an outage counting module 204, an outage timing module 206, and a suspension timing module 208. These elements may be implemented in hardware, software, firmware, or any combination thereof.

Determination logic module 202 determines when conditions exist for the suspension and resumption of EVDO operations. Such determinations are based on information received from various entities. Examples of such information include EVDO outage indicators 220 (e.g., from EVDO network interface module 116) and data communication indicators 222 (e.g., from host 104).

In addition, determination logic module 202 determines when conditions exist for the suspension or resumption of EVDO operations based on information provided by modules 204, 206, and 208.

For instance, outage timing module 206 indicates time intervals during which to assess the number of EVDO outages. During these intervals, the number of EVDO outages are counted by outage counting module 204. Based on the number of outages within such time intervals, determination logic module 202 may generate a suspension directive 224. This directive causes one or more EVDO operations to be suspended. In the context of FIG. 1, suspension directive 224 may be sent to EVDO network interface module 116. The embodiments, however, are not limited to this context.

Upon generation of suspension directive 224, determination logic module 202 may engage suspension timing module 208 to determine and indicate when a corresponding suspension time interval for suspended EVDO operation(s) has elapsed. Once suspension timing module 208 indicates that this suspension time interval has elapsed, determination logic module 202 may generate a resumption directive 226. This directive causes the suspended EVDO operation(s) resume. In the context of FIG. 1, resumption directive 226 may be sent to EVDO network interface module 116. The embodiments, however, are not limited to this context.

Determination logic module 202 may further determine whether EVDO operations may resume based on the initiation of data communications. Such initiated communications may be signaled by data communication indicators 222. Thus, upon receipt of such an indicator, determination logic module 202 may generate resumption directive 226. Also, upon receipt of this indicator, determination logic module 202 may disengage suspension timing module 208. In the context of FIG. 1, data communication indicators 222 may be received from host 104. The embodiments, however, are not limited to this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 3:
FIGS. 3 and 4 are exemplary flow diagrams.

FIG. 3 illustrates one embodiment of a logic flow. In particular, FIG. 3 illustrates a logic flow 300, which may be representative of the operations executed by one or more embodiments described herein.

As shown in FIG. 3, logic flow 300 includes a block 302. At this block, both CDMA2000 operations and EVDO operations are performed. These operations may include monitoring and/or receiving downlink transmissions for each of these networks. Examples of such transmissions include (but are not limited to) pilot signals and paging messages. In the context of FIG. 1, these operations may be performed by network interface modules 114 and 116. The embodiments, however, are not limited to this context.

At a block 304, a number of EVDO outages within a predetermined time interval are determined. As indicated by a block 306, it is determined whether the number of EVDO outages exceeds a predetermined threshold. If so, then operation proceeds to a block 308. At this block, one or more EVDO operations are suspended for a suspension time interval. However, CDMA2000 operations may continue. Thus, communications across CDMA2000 network(s) may remain available.

With reference to FIGS. 1 and 2, suspension of the EVDO operation(s) may involve sending suspension directive 224 to EVDO network interface module 116. The embodiments, however, are not limited to this context.

In the context of FIG. 1, suspension of EVDO operations may involve reducing the amount of power consumed by EVDO network interface module 116. For instance, EVDO network interface module 116 may suspend monitoring for downlink transmissions (e.g., paging messages). Also, this may involve EVDO network interface module 116 entering a sleep mode or state. However, the embodiments are not limited to these examples.

This suspension time interval may be based on various factors, such as the frequency of EVDO outages determined at block 304. Thus, embodiments may employ multiple suspension time intervals based on the extent of EVDO outages determined at block 304. An example of such multiple suspension time intervals is described below with reference to FIG. 4.

As indicated by a block 310, it is determined whether a data communication has been initiated when the one or more EVDO operations are suspended. For example, referring again to FIG. 2, this may involve determining whether a data communication indicator 222 is received. If so, then EVDO operations are resumed at a block 312. Otherwise operation proceeds to a block 316. Referring again to FIGS. 1 and 2, resumption of EVDO operations at block 312 may involve sending resumption directive 226 to EVDO network interface module 116. The embodiments, however, are not limited to this context.

Further, FIG. 3 shows a block 314 at which the data communication is first attempted across EVDO networks (if available) and then across CDMA2000 networks when there is no available EVDO service. The direction of these attempts may be handled by various elements. For example, in the context of FIG. 1, power management module 118 may direct data communications to network interface modules 116 and/or 118. For instance, power management module 118 may first direct the data communications attempt to EVDO network interface module 116. However, if resumed operations fail (e.g., if paging message(s) are not received and/or decoded) from an EVDO network, then power management module 118 may direct the data communications attempt to CDMA2000 network interface module 114.

FIG. 3 shows that, at block 316, EVDO operations are resumed when the suspension time interval has elapsed. Referring again to FIGS. 1 and 2, this may involve sending resumption directive 226 to EVDO network interface module 116. The embodiments, however, are not limited to this context.

Although FIG. 3 is described with reference to EVDO and CDMA2000 communications, embodiments may involve other network types. Further, embodiments may provide for the suspension of operations involving such other network types.

Figure 4:
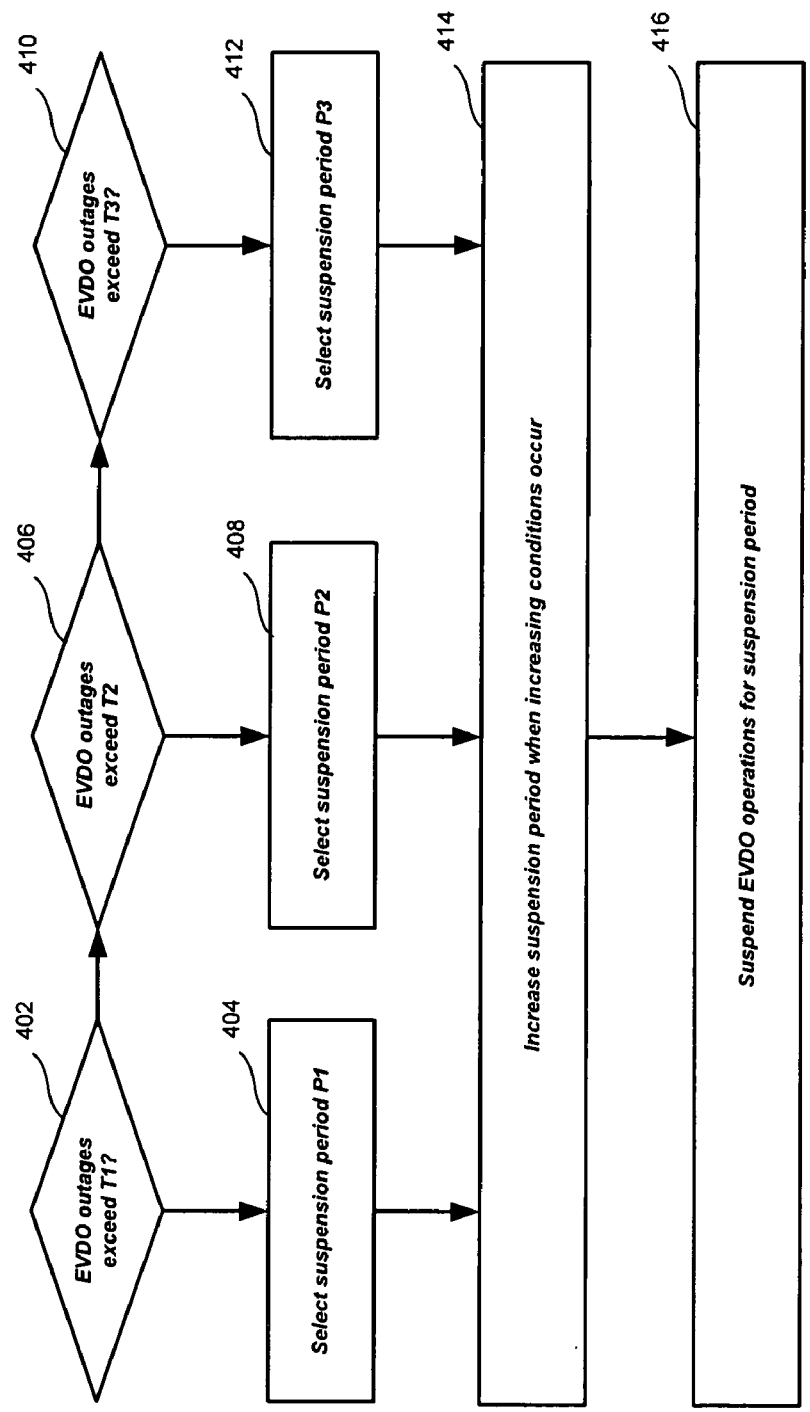

FIG. 4 illustrates one embodiment of a logic flow. In particular, FIG. 4 illustrates a logic flow 400, which may be representative of the operations executed by one or more embodiments described herein.

As described above, embodiments may employ multiple suspension time intervals based on the extent of EVDO outages. FIG. 4 illustrates a logic flow 400 that provides an example of such multiple suspension time intervals. With reference to FIG. 3, this flow may be included in block 308. The embodiments, however, are not limited to this context.

As shown in FIG. 4, it is determined at a block 402 whether EVDO outages have occurred more than T1 times within the predetermined time interval. If so, then a suspension period P1 is selected at a block 404.

Otherwise, it is determined at a block 406 whether EVDO outages have occurred more than T2 times within the predetermined time interval. If so, then suspension period P2 is selected at a block 408. Otherwise operation proceeds to a block 410.

At block 410, it is determined whether EVDO outages have occurred more than T3 times within the predetermined time interval. If so, then a suspension period P3 is selected at a block 412.

FIG. 4 further includes a block 414. At this block, the suspension period may be increased (for example, doubled) when one or more threshold increasing conditions exist. For example, the suspension period may be increased (e.g., doubled) when the threshold that is currently exceeded (e.g., T1, T2, or T3) has been exceeded for a consecutive number (e.g., three) of the predetermined time intervals. Further, FIG. 4 shows a block 416. At this block EVDO operation(s) are suspended for the selected suspension period.

Embodiments may employ various time intervals, outage thresholds, and suspension periods. For example, in embodiments, T1 is greater than T2, and T2 is greater than T3; while P1 is greater than P2, and P2 is greater than P3.

In an exemplary implementation, the predetermined time interval is 512 seconds (100 EVDO slot cycles), T1 is 256 outages, P1 is 1024 seconds, T2 is 128 outages, P2 is 512 seconds, T3 is 32 outages, and P3 is 128 seconds. Moreover, in this exemplary implementation, EVDO operation(s) are not suspended if the number of EVDO outages does not exceed 32 in the predetermined time interval of 512 seconds. These values are provided for purposes of illustration and not limitation.

Thus, embodiments may employ any number of different time intervals, thresholds, and suspension periods. Moreover, each of these parameters may have any combination of values.

Figure 5:
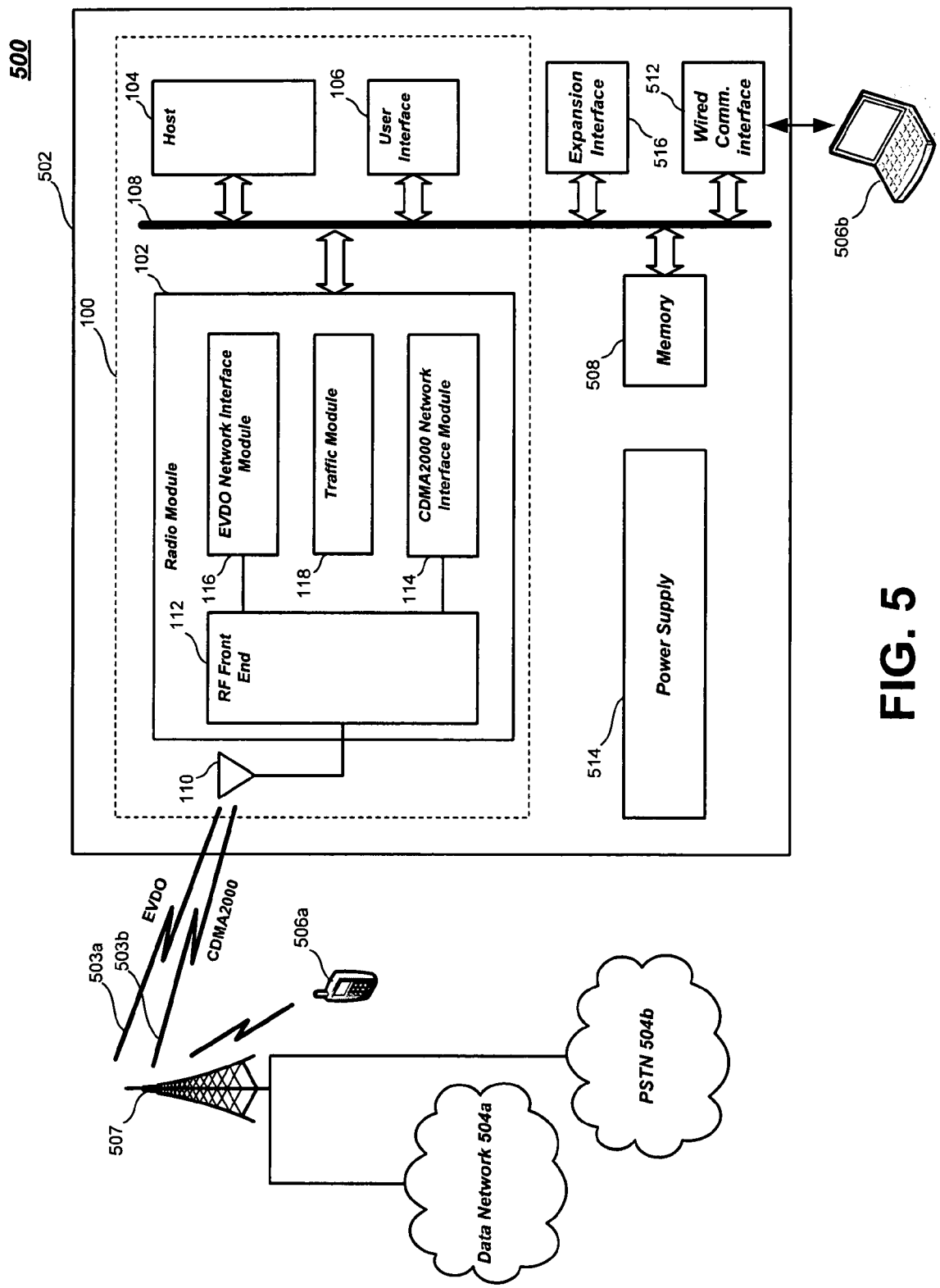
FIG. 5 illustrates an embodiment of a system.

FIG. 5 illustrates an embodiment of a system 500. This system may be suitable for use with one or more embodiments described herein, such as apparatus 100, implementation 200, logic flows 300 and 400, and so forth. Accordingly, system 500 may engage in wireless communications in accordance with the techniques described herein. In addition, system 500 may perform various user applications.

As shown in FIG. 5, system 500 may include a device 502 (e.g., a wireless handset, smartphone, etc.), multiple communications networks 504, and one or more remote devices 506. FIG. 5 shows that device 502 may include the elements of FIG. 1. However, device 502 may include the elements of other embodiments.

Also, device 502 may include a memory 508, a wired communications interface 512, a power supply (e.g., a battery) 514, and an expansion interface 516. These elements may be implemented in hardware, software, firmware, or any combination thereof.

Power supply 514 provides operational power to elements of device 502. Accordingly, power supply 514 may include a battery. Such a battery may be rechargeable and/or removable. Alternatively or additionally, power supply 514 may include an interface to an external power source, such as an alternating current (AC) source. However, the embodiments are not limited to these examples.

Memory 508 may store information in the form of data. For instance, memory 508 may contain application documents, e-mails, sound files, and/or images in either encoded or unencoded formats.

Alternatively or additionally, memory 508 may store control logic, instructions, and/or software components. These software components include instructions that can be executed by one or more processors. Such instructions may provide functionality of one or more elements. Exemplary elements include host 104, one or more components within radio module 102, and/or user interface 106.

Memory 508 may be implemented using any machine-readable or computer-readable media capable of storing data, including both volatile and non-volatile memory. For example, memory 508 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 508 may be included in other elements of system 500. For instance, some or all of memory 508 may be included on a same integrated circuit or chip with elements of apparatus 100 and/or system 500. Alternatively some portion or all of memory 508 may be disposed on an integrated circuit or other medium, for example a hard disk drive, which is external. The embodiments are not limited in this context.

Wired communications interface 512 provides for the exchange of information with a device 506b (e.g., a proximate device), such as a personal computer. This exchange of information may be across one or more wired connections. Examples of such connections include USB interfaces, parallel interfaces, and/or serial interfaces. In addition, interface 512 may provide for such exchanges across wireless connections(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 512 may include various components, such as a transceiver and control logic to perform operations according to one or more communications protocols. In addition, wired communications interface 512 may include input/output (I/O) adapters, physical connectors to connect the I/O adapter with a corresponding communications medium.

Expansion interface 516 may be in the form of an expansion slot, such as a secure digital (SD) slot. Accordingly, expansion interface 516 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

FIG. 5 shows that memory 508, wired communications interface 512, and expansion interface 516 may be coupled to radio module 102, host 104, and user interface 106 by interconnection medium 108.

FIG. 5 shows that device 502 may communicate wirelessly with a base station 507. In particular, FIG. 5 shows these communications including an EVDO connection 503a and a CDMA2000 connection 503b. As shown in FIG. 5, base station 507 may be coupled to a data network 504a (e.g., the Internet), and a public switched telephone network (PSTN) 504b.

Further, base station 507 allows device 502 to communicate with various remote devices. For instance, FIG. 5 shows device 502 engaging in wireless communications (e.g., telephony or messaging) with a mobile device 506a.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Although the above description was made in the context of CDMA2000 and EVDO systems, the techniques described herein may be employed with other wireless telecommunications systems, such cellular radiotelephone systems compliant with the Third-Generation Partnership Project (3GPP), 3GPP2, and so forth. However, the embodiments are not limited to these examples. For example, various 4G systems may be employed. Moreover, embodiments are not limited to particular versions or releases of EVDO and/or CDMA2000. Such versions of EVDO may include (but are not limited to) EVDO rev. A, EVDO rev. B, and/or EVDO rev. C.

Further, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
  a first network interface module to communicate with wireless networks of a first network type;
  a second network interface module to communicate with wireless networks of a second network type; and
  a power management module to suspend one or more operations of the first network interface module for a first time duration when a number of first network type outages exceeds a predetermined outage threshold within a predetermined time interval, the power management module to suspend the one or more operations of the first network interface module for a second time duration when the number of first network type outages exceeds a second predetermined outage threshold within the predetermined time interval, wherein the second predetermined outage threshold is greater than the predetermined outage threshold, and the second time duration is greater than the first time duration.

2. The apparatus of claim 1, wherein the power management module is to place the first network interface module in a sleep state when the number of first network type outages exceeds the predetermined outage threshold within the predetermined time interval.

3. The apparatus of claim 1, wherein the power management module is to reduce a power consumption of the first network interface module when the number of first network type outages exceeds the predetermined outage threshold within the predetermined time interval.

4. The apparatus of claim 1, wherein the power management module resumes the one or more operations of the first network interface module upon an initiation of a data communication.

5. The apparatus of claim 4, wherein the power management module directs the data communication to the second network interface module when resumption the one or more operations of the first network interface module fails.

6. The apparatus of claim 1, wherein the power management module resumes the one or more operations of the first network interface module when a suspension time interval elapses.

7. The apparatus of claim 1, wherein the wireless networks of the first network type provide greater data communication rates than the wireless networks of the second network type.

8. The apparatus of claim 1, wherein the wireless networks of the first network type are EVDO networks, and wherein the wireless networks of the second network type are CDMA2000 networks.

9. A method, comprising:
  performing, by a processor, operations of a first network wireless type and operations of a second wireless network type;
  determining, by the processor, a number of first wireless network type outages within a predetermined time interval;
  suspending, by the processor, one or more of the operations of the first wireless network type for a first time duration when the number of first wireless network type outages exceeds a predetermined outage threshold within a predetermined time interval; and
  suspending, by the processor, the one or more operation of the first wireless network type for a second time duration when the number of first wireless network type outages exceeds a second predetermined outage threshold within the predetermined time interval,
  wherein the second predetermined outage threshold is greater than the predetermined outage threshold, and the second time duration is greater than the first time duration.

10. The method of claim 9, wherein said suspending comprises placing a network interface module in a sleep state.

11. The method of claim 9, wherein said suspending comprises reducing power consumption of a network interface module.

12. The method of claim 9, further comprising:
  resuming the one or more operations of the first wireless network type when a suspension time interval elapses.

13. The method of claim 9, further comprising:
  resuming the one or more operations of the first wireless network type when a data communication is initiated.

14. The method of claim 13, further comprising:
  directing the data communication to the second network interface module when the resumption of the one or more operations of the first network interface module fails.

15. The method of claim 13, further comprising attempting the data communication across a wireless network of the first wireless network type, and attempting the data communication across a wireless network of the second wireless network type when wireless network of the first wireless network type is unavailable.

16. The method of claim 9, wherein the first network type is EVDO, and wherein the second network type is CDMA2000.

17. The method of claim 9, wherein the wireless networks of the first network type provide greater data communication rates than the wireless networks of the second network type.

18. A system, comprising:
  a first network interface module to communicate with wireless networks of a first network type;
  a second network interface module to communicate with wireless networks of a second network type;
  a power management module to suspend one or more operations of the first network interface module for a first time duration when a number of first network type outages exceeds a predetermined outage threshold within a predetermined time interval, the power management module to suspend the one or more operations of the first network interface module for a second time duration when the number of first network type outages exceeds a second predetermined outage threshold within the predetermined time interval, wherein the second predetermined outage threshold is greater than the predetermined outage threshold, and the second time duration is greater than the first time duration; and
  a base station to provide a wireless network of the first network type and a wireless network of the second network type.

19. The system of claim 18, further comprising a battery to provide operational power to the first network interface module.

20. An article comprising a non-transitory machine-readable storage medium containing instructions that if executed enable a system to:
  perform operations of a first network type and operations of a second network type;
  determine a number of first network type outages within a predetermined time interval;
  suspend one or more of the operations of the first network type for a first time duration when the number of first network type outages exceeds a predetermined outage threshold within a predetermined time interval; and
  suspend the one or more operation of the first network type for a second time duration when the number of first network type outages exceeds a second outage threshold within the predetermined time interval,
  wherein the second predetermined outage threshold is greater than the predetermined outage threshold, and the second time duration is greater than the first time duration.

21. The article of claim 20, wherein the storage medium contains instructions that if executed enable a system to:
  resume the one or more operations of the first network type when a data transfer is attempted.

\* \* \* \* \*